(12) United States Patent
Rock et al.

(10) Patent No.: US 9,502,731 B2
(45) Date of Patent: Nov. 22, 2016

(54) FUEL CELL PLATE FEATURES TO RESOLVE DIFFERENCES IN COMPONENT TOLERANCES

(75) Inventors: Jeffrey A. Rock, Fairport, NY (US); Jeff D. Williams, Tonawanda, NY (US); Matthew J. Beutel, Webster, NY (US); Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 628 days.

(21) Appl. No.: 12/949,228

(22) Filed: Nov. 18, 2010

(65) Prior Publication Data

US 2012/0129065 A1    May 24, 2012

(51) Int. Cl.
*H01M 8/04* (2016.01)
*H01M 8/24* (2016.01)
*H01M 8/02* (2016.01)

(52) U.S. Cl.
CPC .......... *H01M 8/241* (2013.01); *H01M 8/0247* (2013.01); *H01M 8/0202* (2013.01); *Y02E 60/50* (2013.01)

(58) Field of Classification Search
CPC .................................................. H01M 8/04559
USPC ......................................................... 429/430
See application file for complete search history.

(56) References Cited

U.S. PATENT DOCUMENTS

| 4,431,714 | A | * | 2/1984 | Myerhoff | H01M 8/02 429/434 |
| 6,933,069 | B2 | * | 8/2005 | Sato | H01M 8/0247 429/430 |
| 7,459,228 | B2 | * | 12/2008 | Aoto | H01M 8/021 429/458 |
| 7,582,378 | B2 | * | 9/2009 | Heystek | H01M 8/0247 429/406 |
| 2004/0234835 | A1 | * | 11/2004 | Strobel | H01M 8/0269 429/442 |
| 2007/0054172 | A1 | * | 3/2007 | Ueda | H01M 8/2475 429/468 |
| 2012/0107713 | A1 | * | 5/2012 | Miller | H01M 8/0273 429/457 |

FOREIGN PATENT DOCUMENTS

| JP | 2009217939 | * | 9/2009 | ............ H01M 8/02 |
| JP | 2009217939 | A |   | 9/2009 |

* cited by examiner

*Primary Examiner* — Ula C. Ruddock
*Assistant Examiner* — Matthew Van Oudenaren
(74) *Attorney, Agent, or Firm* — Fraser Clemens Martin & Miller LLC; James D. Miller

(57) ABSTRACT

A bipolar plate for a fuel cell has a first end, a second end, a first side, and a second side. The bipolar plate also has an active region, a feed region, a perimeter region, a sealing region, and a hinge region. The sealing region is disposed between the perimeter region and each of the active region and the feed region. A plurality of outwardly extending tabs are disposed adjacent the perimeter region at each of the first end and the second end of the bipolar plate. The hinge region is disposed between the perimeter region and the outwardly extending tabs. The hinge region extends from the first side of the plate to the second side of the bipolar plate. The hinge region permits a flexing of the outwardly extending tabs to connect with peripheral electrical device without undesirably flexing the sealing region.

20 Claims, 4 Drawing Sheets

FUEL CELL PLATE FEATURES TO RESOLVE DIFFERENCES IN COMPONENT TOLERANCES

FIELD OF THE INVENTION

The present disclosure relates to a fuel cell and, more particularly, to a fuel cell plate for connecting to peripheral electrical equipment of a fuel cell system.

BACKGROUND OF THE INVENTION

A fuel cell has been proposed as a clean, efficient, and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants, such as hydrogen to the anode and oxygen to the cathode. An MEA and DM preassembled together with a subgasket for the separation of reactant fluids is known as a unitized electrode assembly (UEA).

In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. The electrodes of the fuel cell are generally formed from a finely-divided catalyst. The catalyst may be any electrocatalyst that catalytically supports at least one of an oxidation of hydrogen or methanol, and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, the electrodes, the DM, and a subgasket, for example, in the form of the UEA, are disposed between a pair of fuel cell plates. The pair of fuel cell plates constitutes an anode plate and a cathode plate. Each of the fuel cell plates may have a plurality of channels formed therein for distribution of the reactants and coolant to the fuel cell. The fuel cell plate is typically formed by a conventional process for shaping sheet metal such as stamping, machining, molding, or photo etching through a photolithographic mask, for example. In the case of a bipolar fuel cell plate, the fuel cell plate is typically formed from a pair of unipolar plates, which are then joined to form the bipolar fuel cell plate.

The fuel cell stack is generally connected to peripheral equipment for transfer of electrical power to electrical motors and circuitry, and for monitoring the performance of the fuel cell stack. Typical peripheral equipment includes cell voltage monitoring (CVM) equipment. Dimensional variations in the various fuel cell components, as well as dimensional variations in the peripheral equipment, can lead to interference. The interference results in difficulties in making proper electrical connections between the fuel cell stack and the peripheral equipment.

Known multicell CVM connector-to-plate interface concepts have used oversized contact pads or outward facing contacts in single rows, which are individually connected to each bipolar fuel cell plate. Such board-on-edge concepts place undesirable constraints on the stack repeat distance, and thus, the number of bipolar fuel cell plates that can be serviced by each electrical connection board.

There is a continuing need for a bipolar fuel cell plate that permits mating of the bipolar fuel cell plate and peripheral equipment despite dimensional variations.

SUMMARY OF THE INVENTION

In concordance with the instant disclosure, a bipolar fuel cell plate that permits mating of the bipolar fuel cell plate and peripheral equipment despite variations in tolerances and stack repeat distance, is surprisingly discovered.

By designing a hinge region into the bipolar plates of the present disclosure, a cell voltage monitoring tab of each bipolar plate can be deflected to match the connector spacing without impacting the load on a neighboring seal of the bipolar plate. To maintain control of the rough location of the tabs, the clearance in the finger regions is carefully sized. Instead of attempting to exactly match the spacing, the connector is undersized so that interference will not be produced. The connector then pinches the tab spacing to match it. Since certain neighboring connectors overlap in the stacking direction, the over lapping ones are not positioned side by side so that the plate can twist over a longer span. A widened boss and a narrow slot arrangement are also used to improve the in-plane position control.

In one embodiment, a bipolar plate for a fuel cell has a first end, a second end, a first side, and a second side. The bipolar plate also has an active region, a feed region, a perimeter region, a sealing region, and a hinge region. The perimeter region circumscribes each of the active region and the feed region. The sealing region is disposed between the perimeter region and each of the active region and the feed region. A plurality of outwardly extending tabs are disposed adjacent the perimeter region at each of the first end and the second end of the plate. The hinge region is disposed between the perimeter region and the outwardly extending tabs at each of the first end and the second end of the bipolar plate. The hinge region extends from the first side of the plate to the second side of the bipolar plate. The hinge region permits a flexing of the outwardly extending tabs to connect with peripheral electrical device without undesirably flexing the sealing region.

In another embodiment, a fuel cell stack includes a pair of the bipolar plates. The fuel cell stack also includes a unitized electrode assembly having a subgasket and a membrane electrode assembly disposed between a pair of diffusion medium layers. The membrane electrode assembly and the diffusion medium layers are disposed between the bipolar plates to form the fuel cell stack.

In a further embodiment, a fuel cell system includes the fuel cell stack with the bipolar plates. The fuel cell system also includes a plurality of peripheral electrical devices. Each of the peripheral electrical devices has a plurality of electrical connectors. At least a portion of the electrical connectors in electrical communication with at least a portion of the tabs of the bipolar plates. The hinge region permits a flexing of the outwardly extending tabs to connect with the electrical connectors of the peripheral electrical device without undesirably flexing the sealing region of the bipolar plates.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
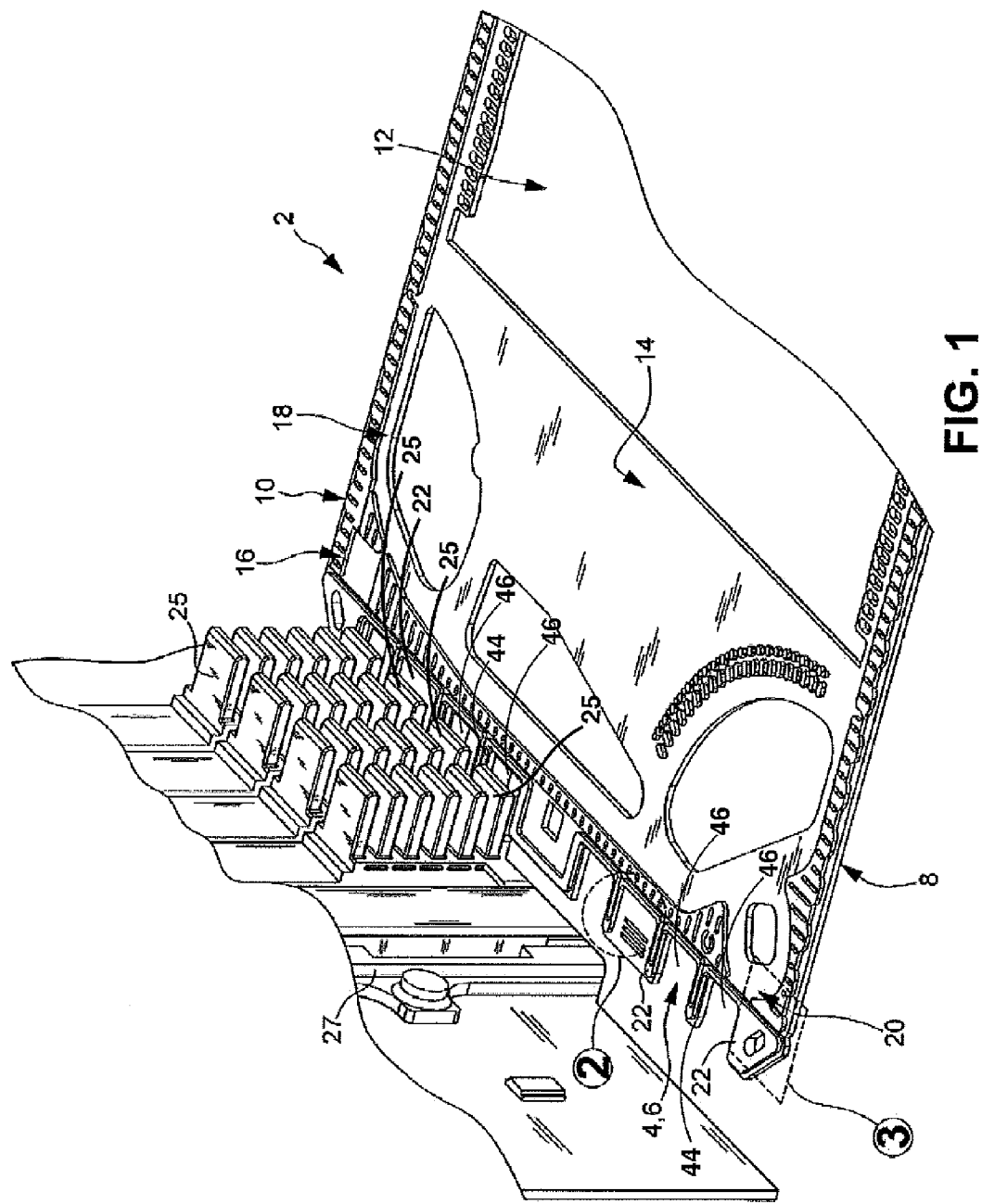
FIG. 1 is a fragmentary top perspective view of a bipolar fuel cell plate according to one embodiment of the present disclosure, the bipolar fuel cell plate disposed adjacent an electrical connection board for purposes of illustration.

The following detailed description and appended drawings describe and illustrate various embodiments of the invention. The description and drawings serve to enable one skilled in the art to make and use the invention, and are not intended to limit the scope of the invention in any manner.

With reference to FIGS. 1-5, a bipolar plate 2 of the present disclosure has a first end 4, a second end 6, a first side 8, and a second side 10. The bipolar plate 2 further includes an active region 12, a feed region 14, a perimeter region 16, a sealing region 18, and a hinge region 20. The perimeter region 16 circumscribes the active region 12 and the feed region 14. The sealing region 18, also known as a "sealing gland", is disposed between the perimeter region 16 and each of the active region 12 and the feed region 14.

A plurality of outwardly extending tabs 22 is disposed adjacent the hinge region 20 at each of the first end 4 and the second end 6 of the bipolar plate 2. The end of the bipolar plate 2 shown in FIG. 1 can be the first end 4 or the second end 6, as desired. Since either the first end 4 or the second end 6 can provide the tabs 22 for electrical connection, and the bipolar plate 2 may be reversible, it should be appreciated that positioning the tabs 22 at both the first end 4 and the second end 6 of the bipolar plate 2 simplifies several diagnostics while saving part numbers during assembly of a fuel cell stack 34 (shown in FIGS. 4 and 5).

A plurality of outwardly extending projections 44 is disposed adjacent the hinge region 20 at each of the first end 4 and the second end 6 of the bipolar plate 2. The end of the bipolar plate 2 shown in FIG. 1 can be the first end 4 or the second end 6, as desired. The projections 44 are each an integral extension of the hinge region of the plate where the projections 44 are narrower than the tabs 22. The projections 44 and the tabs 22 define a plurality of spaces 46, where each space 46 is substantially equivalent to the portion of the tab 22 in electrical communication with the electrical connector 25.

The hinge region 20 is disposed between the perimeter region 16 and the outwardly extending tabs 22 at each of the first end 4 and the second end 6 of the bipolar plate 2. The hinge region 20 extends from the first side 8 of the bipolar plate 2 to the second side 10 of the bipolar plate 2. The hinge region 20 advantageously permits a flexing of the outwardly extending tabs 22 to connect with electrical connectors 25 of at least one peripheral electrical device 27 without undesirably flexing the sealing region 18. The undesirable flexing of the sealing region 18 may result in an unsealing of the sealing region 18, and a leakage during operation, when the bipolar plate 2 is disposed in the fuel cell stack 34.

In particular embodiments, an average thickness of the hinge region 20 may be less than an average thickness of the tabs 22 and an average thickness of the perimeter region 16, which are each disposed adjacent the hinge region 20. It should be understood that the lower average thickness of the hinge region 20 promotes the flexing of the bipolar plate 2 at the hinge region 20 during manufacturing and handling of the bipolar plate 2 and assembly with the peripheral electrical device 27. The thickness of the hinge region 20 is also selected to minimize a vulnerability of the bipolar plate 2 to deformation in handling during manufacture. As a nonlimiting example, the average thickness of the hinge region 20 is about 150 microns and the average thickness of each of the tabs 22 and the adjacent perimeter region 16 is from about 450 microns to about 750 microns. One of ordinary skill in the art may select alternative thicknesses of the perimeter region 16, the hinge region 20, and the tabs 22, as desired.

The average thickness of each of the perimeter region 16 and the tabs 22 may be based on a raised reinforcement feature 24 disposed respectively thereon. As a nonlimiting example, the raised reinforcement features 24 may have a height from about 150 microns to about 300 microns above the surface of the planar bipolar plate 2, although other heights can be used. Where each of the perimeter region 16 and the tabs 22 includes the raised reinforcement features 24, the hinge region 20 is disposed between the raised reinforcement features 24 of the perimeter region 16 and the tabs 22.

Figure 2:
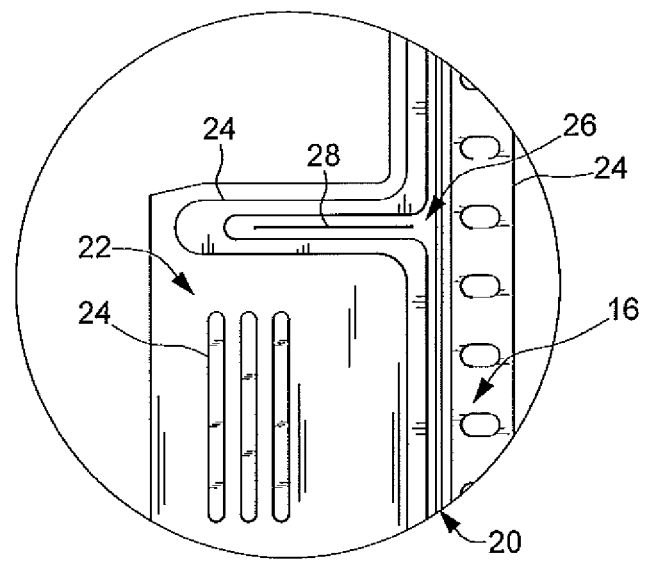
FIG. 2 is an enlarged fragmentary top plan view of the bipolar fuel cell plate depicted in circle 2 of FIG. 1.

The raised reinforcement features 24 on the tabs 22 may also be configured to contact the electrical connectors 25 of the at least one peripheral electrical device 27. For example, as shown in FIG. 2, the raised reinforcement features 24 on the outwardly extending tabs 22 may be a plurality of elongate rows that are oriented substantially orthogonal to an axis of orientation of the outwardly extending tabs 22. Other shapes and orientations of the raised reinforcement features 24 on the perimeter region 16 and the tabs 22 may also be employed, as desired.

In a particular embodiment illustrated in FIG. 2, a portion of the raised reinforcement feature 24 of the tabs 22 may be substantially U-shaped. An open end 26 of the U-shaped raised reinforcement feature 24 may be oriented to face the hinge region 20 of the bipolar plate 2. A weld 28 is formed within the U-shaped raised reinforcement feature 24. The weld 28 may be employed, at least in part, to secure a first unipolar plate and a second unipolar plate to form the unitary bipolar plate 2. The weld 28 does not extend into the hinge region 20, as the weld 28 would otherwise undesirably affect the flexibility of the hinge region 20.

Figure 3:
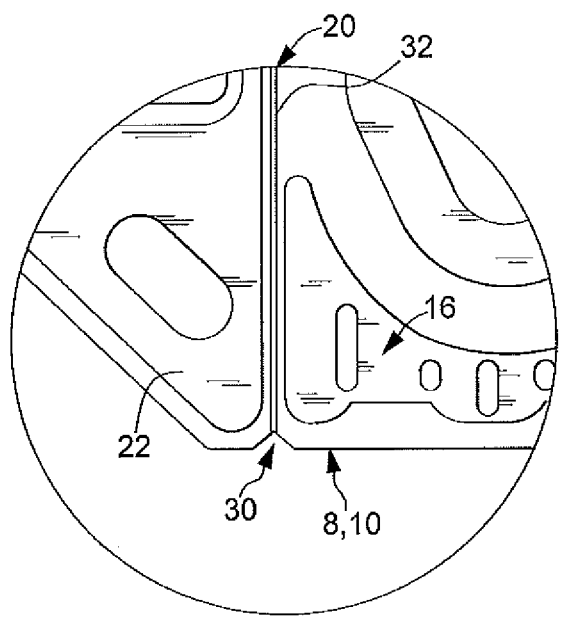
FIG. 3 is another enlarged fragmentary top plan view of the bipolar fuel cell plate depicted in rectangle 3 of FIG. 1.

As further shown in FIG. 3, the bipolar plate 2 of the present disclosure may include a notch 30. The notch 30 is disposed in the hinge region at each of the first side 8 and the second side 10 of the bipolar plate 2. In certain embodiments, the notch 30 is substantially V-shaped. The bipolar plate 2 may also have a score line 32 formed therein. The score line 32 is formed in the hinge region 20 along a length of the hinge region 20. The score line 32 may extend from the first side 8 to the second side 10 of the bipolar plate 2. Each of the notches 30 and the score line 32 may be stamped into the hinge region 20, as one nonlimiting example. It should be appreciated that the notches 30 in the bipolar plate 2, and the score line 32 extending between the first and second sides 8, 10 of the bipolar plate 2, promote the desirable flexing of the hinge region 20.

Figure 4:
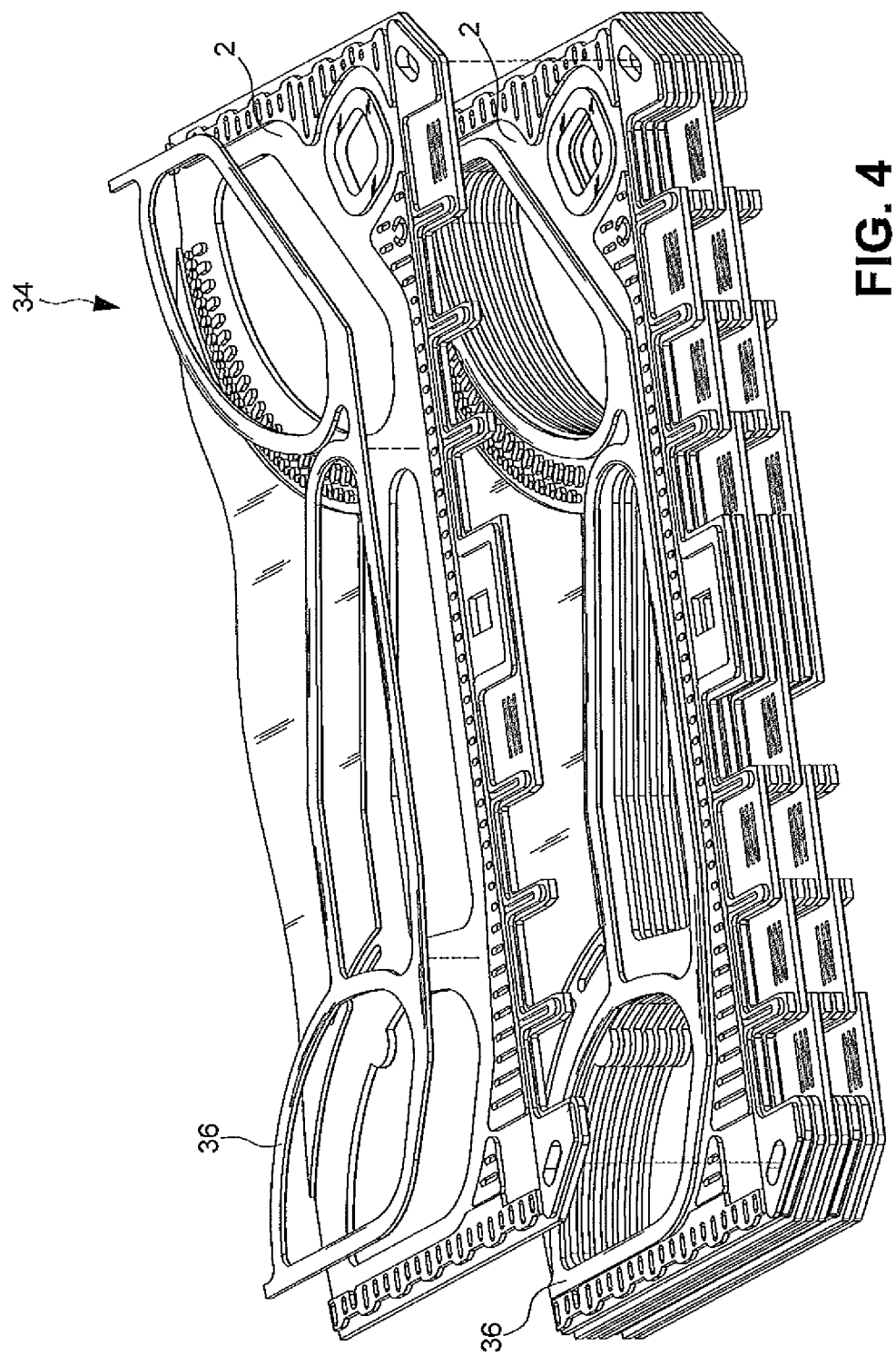
FIG. 4 is a fragmentary side perspective view of a fuel cell stack having a plurality of the bipolar plates shown in FIG. 1, with some of the bipolar plates omitted for purposes of illustration.
Figure 5:
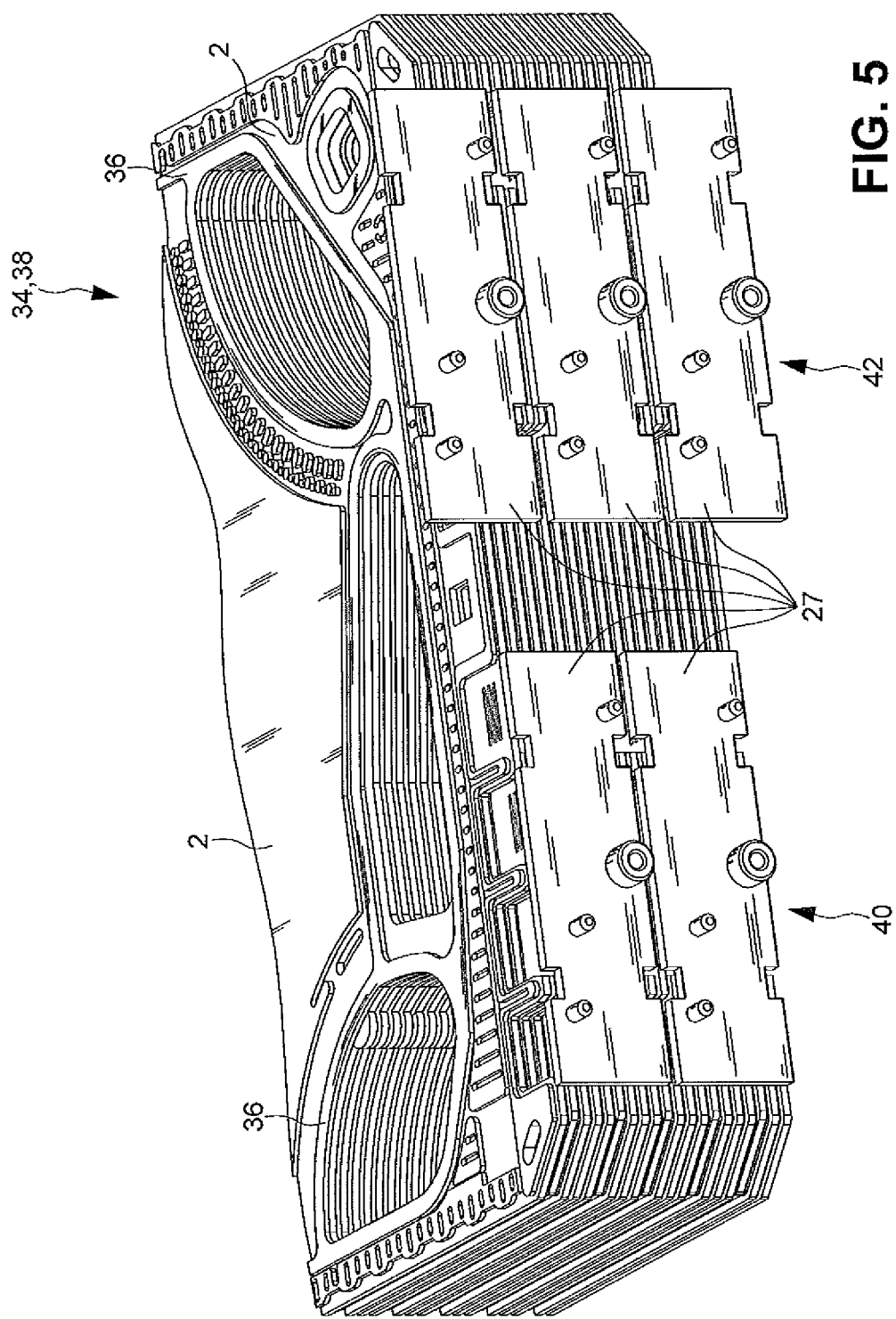
FIG. 5 is a fragmentary side perspective view of the fuel cell stack depicted in FIG. 4, with electrical connector boards shown in electrical communication with the bipolar plates.

Referring now to FIGS. 4 and 5, the present disclosure further includes the fuel cell stack 34 having a plurality of the bipolar plates 2 and a plurality of unitized electrode assemblies 36. Each of the unitized electrode assemblies 36 includes a subgasket and a membrane electrode assembly disposed between a pair of diffusion medium layers. The membrane electrode assembly and the diffusion medium layers disposed between the bipolar plates 2. The bipolar plates 2 and the unitized electrode assemblies 36 are stacked in alternating fashion and compressed to form the fuel cell stack 34.

With particular reference to FIGS. 1 and 5, the present disclosure also includes a fuel cell system 38 including the fuel cell stack 34 and a plurality of the peripheral electrical devices 27. Each of the peripheral electrical devices 27 includes the plurality of electrical connectors 25. At least a portion of the electrical connectors 25 is in electrical communication with at least a portion of the tabs 22 of the bipolar plates 2 of the fuel cell stack 34. As further explained hereinabove, the hinge region 20 permits a flexing of the outwardly extending tabs 22 to connect with the electrical connectors 25 of the peripheral electrical devices 27 without undesirably flexing the sealing region 18 of the bipolar plates 2.

In a particular embodiment, the peripheral electrical devices 27 are Embedded Measurement Module (EMM) boards. The EMM boards are arranged in a first vertical row 40 and a second vertical row 42 along an end of the fuel cell stack 34. The EMM boards are arranged to eliminate overlap effects. For example, the first vertical row 40 is arranged in a staggered relationship relative to the second vertical row 42. The use of the double row arrangement has been found desirable for efficient electronics packaging. Since certain electrical connectors 25 on one board overlap the electrical connectors 25 on the next board in the stacking direction, the overlapping electrical connectors 25 are not positioned side by side so that the bipolar plates 2 can twist over a longer span. It should be understood that the use of other peripheral electrical devices 27 is also within the scope of the present disclosure.

A widened boss and a narrow slot arrangement are employed according to the present disclosure to improve the in-plane position control of the fuel cell stack 34. For example, each of the portion of the tabs 22 in electrical communication with the electrical connectors 25 may be wider than adjacent slots between the tabs 22 of the bipolar plate 2. The electrical connectors 25 are also narrower than the portion of the tabs 22 in electrical communication with the electrical connectors 25. An opportunity for interference between the tabs 22 and the electrical connectors 25 during assembly of the fuel cell system 38 is thereby minimized. Excessive location variation is avoided by pairing a widened boss with a narrow slot, providing a single locating feature in the lateral direction while avoiding redundant and potentially interfering constraints.

Advantageously, the bipolar plate 2 of the present disclosure permits mating of the bipolar plate 2 and the peripheral electrical devices 27 despite variations in tolerances and stack repeat distance.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bipolar plate for a fuel cell, comprising:
   a plate having a first end, a second end, a first side, and a second side, the plate further having an active region, a feed region, a perimeter region, a sealing region, and a hinge region,
   the perimeter region circumscribing the active region and the feed region,
   the sealing region disposed between the perimeter region and each of the active region and the feed region,
   the plate further having a plurality of outwardly extending tabs disposed adjacent the perimeter region at each of the first end and the second end of the plate, the tabs each being an integral extension of the hinge region of the plate,
   the plate further having a plurality of outwardly extending projections disposed adjacent the perimeter region at each of the first end and the second end of the plate, the projections each being an integral extension of the hinge region of the plate, the projections narrower than the tabs,
   the hinge region disposed between and integrally fixing the perimeter region to the outwardly extending tabs at each of the first end and the second end of the plate, wherein the active region, the feed region, the perimeter region, the hinge region, and the outwardly extending tabs are arranged in order from a longitudinal center of the plate to each of the first end and the second end of the plate,
   the hinge region having an average thickness less than an average thickness of the tabs and an average thickness of the perimeter region disposed adjacent the hinge region and extending from the first side of the plate to the second side of the plate, and permitting individual flexing of each of the outwardly extending tabs to connect with at least one peripheral electrical device without undesirably flexing the sealing region of the plate.

2. The bipolar plate of claim 1, wherein the perimeter region includes a raised reinforcement feature and the tabs include a raised reinforcement feature.

3. The bipolar plate of claim 2, where at least one of the raised reinforcement features of the tabs is configured to contact adjacent electrical connectors of the at least one peripheral electrical device.

4. The bipolar plate of claim 2, wherein the hinge region is disposed between the raised reinforcement features of the perimeter region and the tabs.

5. The bipolar plate of claim 2, wherein a portion of the raised reinforcement feature of the tabs is substantially U-shaped.

6. The bipolar plate of claim 5, wherein an open end of the U-shaped raised reinforcement feature faces the hinge region.

7. The bipolar plate of claim 6, wherein a weld is formed within the U-shaped raised reinforcement feature, the weld extending up to the hinge region.

8. The bipolar plate of claim 1, including a notch formed in the hinge region at the first side and the second side of the plate, the notches promoting the flexing of the hinge region.

9. The bipolar plate of claim 8, wherein the notch is substantially V-shaped.

10. The bipolar plate of claim 1, including a score line formed in the hinge region along a length of the hinge region from the first side to the second side of the plate, the score line promoting the flexing of the hinge region.

11. The bipolar plate of claim 10, wherein the score line is stamped into the hinge region.

12. The bipolar plate of claim 1, including a first unipolar plate and a second unipolar plate, the first unipolar plate welded to the second unipolar plate to form the plate, each of the first unipolar plate and the second unipolar plate having a notch in the hinge region at the first side and the second side of the plate, and a score line formed in the hinge region along a length of the hinge region from the first side to the second side of the plate, the notches and the score line promoting the flexing of the hinge region.

13. A fuel cell stack, comprising:
 a pair of bipolar plates, each of the bipolar plates including a plate having a first end, a second end, a first side, and a second side, the plate further having an active region, a feed region, a perimeter region, a sealing region, and a hinge region, the perimeter region circumscribing the active region and the feed region, the sealing region disposed between the hinge region and each of the active region and the feed region, the plate further having a plurality of outwardly extending tabs disposed adjacent the perimeter region at each of the first end and the second end of the plate, the plate further having a plurality of outwardly extending projections disposed adjacent the perimeter region at each of the first end and the second end of the plate, the projections each being an integral extension of the hinge region of the plate, the projections narrower than the tabs, the hinge region disposed between and integrally fixing the perimeter region to the outwardly extending tabs at each of the first end and the second end of the plate, the tabs each being an integral extension of the hinge region of the plate wherein the active region, the feed region, the perimeter region, the hinge region, and the outwardly extending tabs are arranged in order from a longitudinal center of the plate to each of the first end and the second end of the plate, the hinge region having an average thickness less than an average thickness of the tabs and an average thickness of the perimeter region disposed adjacent the hinge region and extending from the first side of the plate to the second side of the plate, and permitting individual flexing of each of the outwardly extending tabs to connect with a peripheral electrical device without undesirably flexing the sealing region of the plate; and
 a unitized electrode assembly including a subgasket and a membrane electrode assembly disposed between a pair of diffusion medium layers, the membrane electrode assembly and the diffusion medium layers disposed between the bipolar plates.

14. A fuel cell system, comprising:
 a fuel cell stack including a pair of bipolar plates, each of the bipolar plates including a plate having a first end, a second end, a first side, and a second side, the plate further having an active region, a feed region, a perimeter region, a sealing region, and a hinge region, the perimeter region circumscribing the active region and the feed region, the sealing region disposed between the perimeter region and each of the active region and the feed region, the plate further having a plurality of outwardly extending tabs disposed adjacent the hinge region at each of the first end and the second end of the plate such that the first end is identical to the second end thereby allowing the bipolar plates to be reversed within the fuel cell stack, the plate further having a plurality of outwardly extending projections disposed adjacent the perimeter region at each of the first end and the second end of the plate, the projections each being an integral extension of the hinge region of the plate, the projections narrower than the tabs, the hinge region disposed between and integrally fixing the perimeter region to the outwardly extending tabs at each of the first end and the second end of the plate, the tabs each being an integral extension of the hinge region of the plate wherein the active region, the feed region, the perimeter region, the hinge region, and the outwardly extending tabs are arranged in order from a longitudinal center of the plate to each of the first end and the second end of the plate, the hinge region having an average thickness less than an average thickness of the tabs and an average thickness of the perimeter region disposed adjacent the hinge region and extending from the first side of the plate to the second side of the plate, and a unitized electrode assembly including a subgasket and a membrane electrode assembly disposed between a pair of diffusion medium layers, the membrane electrode assembly and the diffusion medium layers disposed between the bipolar plates; and
 a plurality of peripheral electrical devices, each of the peripheral electrical devices including a plurality of electrical connectors, at least a portion of the electrical connectors in electrical communication with at least a portion of the tabs of the plate,
 wherein the hinge region permits a flexing of the outwardly extending tabs to connect with the electrical connectors of the peripheral electrical device without undesirably flexing the sealing region of the plate.

15. The fuel cell system of claim 14, wherein the peripheral electrical devices are Embedded Measurement Module (EMM) boards.

16. The fuel cell system of claim 15, wherein the EMM boards are arranged in a first vertical row and a second vertical row along an end of the fuel cell stack.

17. The fuel cell system of claim 16, wherein the first vertical row is arranged in a staggered relationship relative to the second vertical row.

18. The fuel cell system of claim 14, wherein the electrical connectors are narrower than slots in the plates, whereby an opportunity for interference is minimized.

19. The fuel cell system of claim 18, wherein the electrical connectors are paired with narrow slots between the tabs of the plate, whereby an improved in-plane position control is provided.

20. The fuel cell system of claim 14, wherein the plurality of tabs and the plurality of projections define a plurality of spaces, each of the plurality of spaces substantially equivalent to the at least a portion of the tabs in electrical communication with the electrical connectors.

* * * * *